United States Patent [19]

Sigwart et al.

[11] Patent Number: 5,939,590
[45] Date of Patent: Aug. 17, 1999

[54] TETRAHYDROFURAN/BUT-2-YNE-1, 4-DIOL COPOLYMERS CONTAINING C-C TRIPLE BONDS

[75] Inventors: Christoph Sigwart, Schriesheim; Rolf Fischer, Heidelberg; Rainer Becker, Bad Dürkheim; Klaus-Dieter Plitzko, Limburgerhof; Gerd Heilen, Neustadt; Christof Palm, Ludwigshafen; Peter Groll, Dannstadt-Schauernheim, all of Germany

[73] Assignee: Basf Aktiengesellschaft, Ludwigshafen, Germany

[21] Appl. No.: 08/894,746

[22] PCT Filed: Feb. 21, 1996

[86] PCT No.: PCT/EP96/00702

§ 371 Date: Aug. 26, 1997

§ 102(e) Date: Aug. 26, 1997

[87] PCT Pub. No.: WO96/27626

PCT Pub. Date: Sep. 12, 1996

[30] Foreign Application Priority Data

Mar. 3, 1995 [DE] Germany ............ 195 07 399

[51] Int. Cl.⁶ .................................. C08G 65/20
[52] U.S. Cl. .................. 568/616; 568/617; 525/539; 525/412; 528/392; 528/405; 528/417
[58] Field of Search .................... 525/539, 412; 528/405, 417, 392; 568/616, 617

[56] References Cited

U.S. PATENT DOCUMENTS

| 4,658,065 | 4/1987 | Aoshima et al. | 564/487 |
| 5,393,847 | 2/1995 | Alloin et al. | 525/403 |
| 5,395,959 | 3/1995 | Weyer et al. | 560/231 |

FOREIGN PATENT DOCUMENTS

| 126 471 | 11/1984 | European Pat. Off. . |
| 221 586 | 5/1987 | European Pat. Off. . |
| 367 087 | 5/1990 | European Pat. Off. . |
| 503 392 | 9/1992 | European Pat. Off. . |
| 95/15991 | 6/1995 | WIPO . |

OTHER PUBLICATIONS

Copy of German Language OZ 0050/42293.
Derwent 70–29238.
Macromolecules, No. 8, (1986).
J. of Appl. Polymer Sci, May 20, No. 7, (1988).
TetrahydrofuranPolymerization . . . , Poly. Sci, vol. 36.

*Primary Examiner*—Frederick Krass
*Attorney, Agent, or Firm*—Keil & Weinkauf

[57] ABSTRACT

Tetrahydrofuran/but-2-yne-1,4-diol copolymers containing C—C triple bonds and having an average molecular weight $M_n$ of from 500 to 3500 Dalton and a content of from 0.5 to 3 mol of triple bonds/mol of copolymer and blends of these copolymers with polytetrahydrofuran having an average molecular weight $M_n$ of from 500 to 3500 Dalton, processes for their preparation and their use.

15 Claims, 1 Drawing Sheet

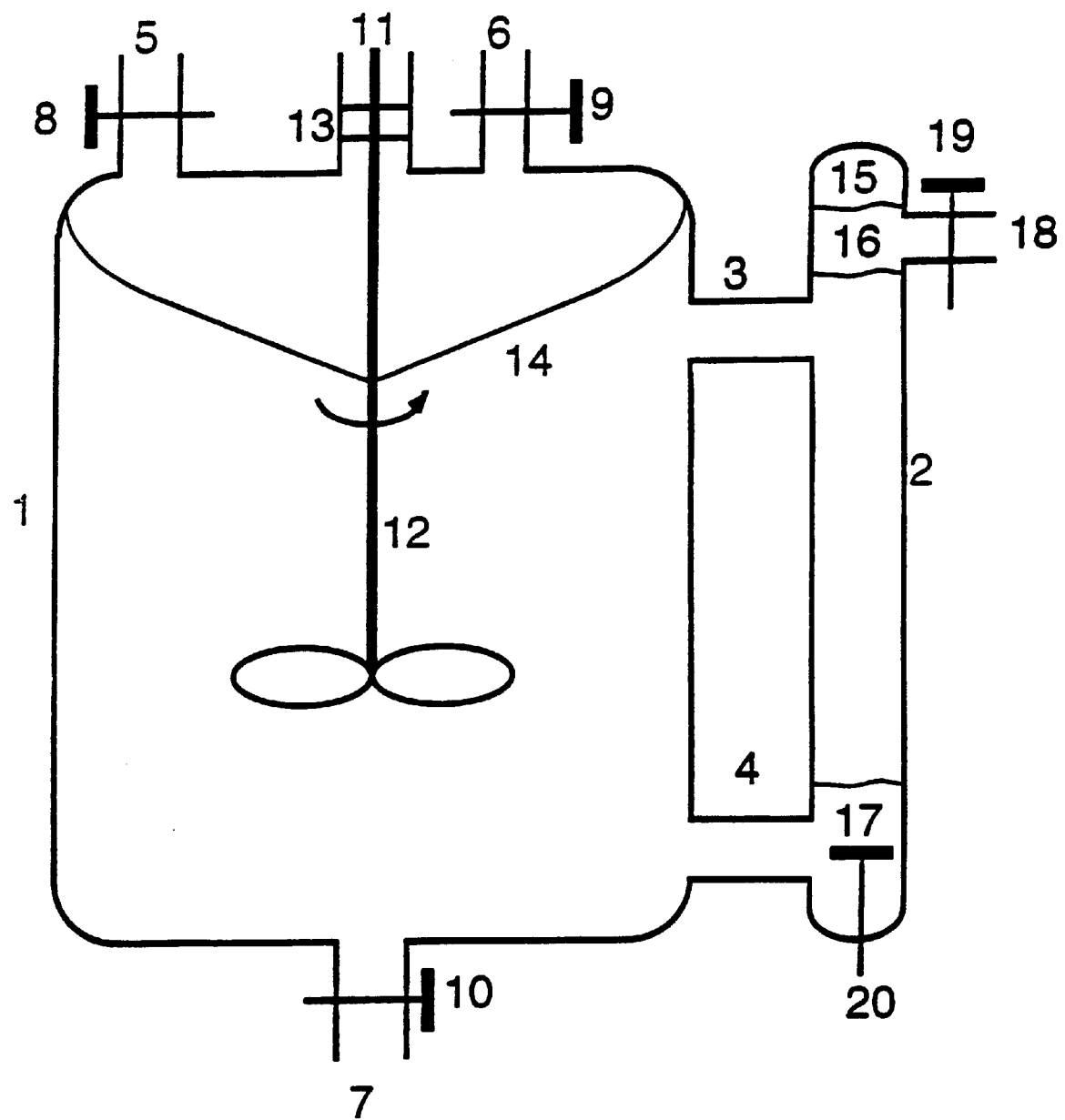

TETRAHYDROFURAN/BUT-2-YNE-1, 4-DIOL COPOLYMERS CONTAINING C-C TRIPLE BONDS

The present invention relates to tetrahydrofuran/but-2-yne-1,4-diol copolymers containing C—C triple bonds and having an average molecular weight $M_n$ of from 500 to 3500 Dalton and a content of from 0.5 to 3.0 mol of triple bonds/mol of copolymer and blends of these copolymers with polytetrahydrofuran having an average molecular weight $M_n$ of from 500 to 3500 Dalton.

The present invention further relates to a process for the preparation of tetrahydrofuran/but-2-yne-1,4-diol copolymers containing C—C triple bonds.

The present invention also relates to a process for the preparation of polyoxytetramethylene glcyol (polytetrahydrofuran, PTHF) and a process for the preparation of polyoxytetramethylene glycols containing C—C double bonds, polyoxytetramethylene glycols containing internal C—C double bonds and having an average molecular weight $M_n$ of from 500 to 3500 Dalton and a content of from 0.1 to 3 mol of double bonds/mol of polyoxytetramethylene glycol and blends of these polyoxytetramethylene glycols containing internal C—C double bonds with polytetrahydrofuran having an average molecular weight $M_n$ of from 500 to 3500 Dalton.

It is known that tetrahydrofuran can be polymerized with saturated α, ω-diols and hydrated heteropolyacids as catalysts to give saturated polyether polyols. According to U.S. Pat. No. 4,658,065 (Aoshima et al.), polyoxytetramethylene glycol is obtained, for example, in continuous experiments for the polymerization of tetrahydrofuran in the presence of 1,4-butanediol using hydrated dodecatungstatophosphoric acid as a catalyst. This process has the disadvantage that only unsatisfactory space-time yields are obtained in the preparation of polytetrahydrofuran having a relatively low average molecular weight, for example from polytetrahydrofuran having an average molecular weight of 1000 Dalton. This disadvantage is particularly serious because polytetrahydrofuran having this relatively low average molecular weight is of particularly great commercial interest.

According to EP-A 503 393, polyoxytetramethylene glycol monoethers are prepared from monohydric alcohols by polymerization of tetrahydrofuran in the presence of a monohydric alcohol using an anhydrous heteropolyacid catalyst.

According to Maksimov et al., Polymer Science, Ser. B. 36 (1994), 412, the monopropargyl ether of tetrahydrofuran is obtained by the polymerization of tetrahydrofuran with propargyl alcohol in the presence of anhydrous tungstatophosphoric acid but, owing to its chemical structure, is of virtually no industrial use.

According to EP-A 126 471, hydrated heteropolyacids are used as catalysts for the polymerization of tetrahydrofuran (THF) to give polyoxytetramethylene glycol. The disadvantage of this process is in particular the low THF conversion, which has only about 8% in the preparation of polyoxytetramethylene glycols having a relatively low average molecular weight, which are of particular commercial interest. The polyoxytetramethylene glycols prepared by this process are worthy of further improvement with respect to their color number.

It is an object of the present invention to provide novel polyoxyalkylene glycols which contain C—C triple bonds or C—C double bonds, where these unsaturated groups should be located at the end and/or in the interior of the polyoxyalkylene glycol molecules. An associated object is to provide a process for the preparation of such polyoxyalkylene derivatives. Starting from these unsaturated polyoxyalkylene glycol derivatives, it is furthermore intended to provide a process for the preparation of polyoxytetramethylene glycol, also referred to as polytetrahydrofuran (PTHF). The object is to obtain polytetrahydrofuran having a particularly low color number and high uniformity.

We have found that this object is achieved by tetrahydrofuran/but-2-yne-1,4-diol copolymers containing C—C triple bonds and having an average molecular weight $M_n$ of from 500 to 3500 Dalton and a content of from 0.5 to 3.0 mol of triple bonds/mol of copolymer and blends of these copolymers with polytetrahydrofuran having an average molecular weight $M_n$ of from 500 to 3500 Dalton.

We have also found a process for the preparation of tetrahydrofuran/but-2-yne-1,4-diol copolymers containing C—C triple bonds, which comprises copolymerizing tetrahydrofuran with but-2-yne-1,4-diol with the aid of a heteropolyacid catalyst in an essentially anhydrous reaction medium.

We have furthermore found a process for the preparation of polyoxytetramethylene glycol, which comprises hydrogenating a tetrahydrofuran/but-2-yne-1,4-diol copolymer with the aid of a hydrogenation catalyst.

We have also found a process for the preparation of polyoxytetramethylene glycols containing double bonds, which comprises partially hydrogenating the C—C triple bonds of tetrahydrofuran/but-2-yne-1,4-diol copolymers over a hydrogenation catalyst.

The novel tetrahydrofuran/but-2-yne-1,4-diol copolymers have an average molecular weight $M_n$ of in general from 500 to 3500, preferably from 650 to 2900, Dalton, a C—C triple bond content of in general from 0.5 to 3, preferably from 0.6 to 2.5, particularly preferably from 0.7 to 1.25, mol of triple bonds —C≡C—/mol of copolymer, determined by $^1$H nuclear magnetic resonance (NMR) spectroscopy.

Depending on their preparation, the copolymers contain the polymerized but-2-yne-1,4-diol units distributed over the copolymer, the evaluation of the $^1$H-NMR spectra of the copolymers evidently indicating that the units originating from the but-2-yne-1,4-diol are largely incorporated as terminal groups in the copolymer and are present to a smaller extent in the interior of the copolymer molecule, and the distribution of the but-2-yne-1,4-diol monomer units in the interior of the copolymer being randomly distributed. The differentiation between, and quantification of, the but-2-yne-1,4-diol units incorporated in the interior of the copolymer and those incorporated as terminal groups in the copolymer in the NMR spectrum are permitted by the different chemical shifts of the proton signals of the methylene groups which are directly adjacent to the triple bonds and, depending on whether a —C≡C—CH$_2$—OH unit, i.e. a terminal group, or a —C≡C—CH$_2$—O—CH$_2$— unit, i.e. a but-2-yne-1,4-diol unit located in the interior of the copolymer, is present, appears at low or higher field, in general at 4.3 or 4.2 ppm, based on the internal standard tetramethylsilane. By integrating these NMR signals, it is possible to determine the proportion of but-2-yne-1,4-diol units in the copolymer which are present in the interior of the molecule or of said units which function as terminal groups.

The molar ratio of terminal but-2-yne-1,4-diol units to internal but-2-ynediol units in the copolymer is in general from 1.0:0.1 to 1.0:1.6.

As stated above, the tetrahydrofuran/but-2-ynediol copolymers may contain from 0.5 to 3 mol of C—C triple bonds, corresponding to 0.5 to 3 mol of but-2-ynediol monomer units, per mole of copolymer. Since the copolymerization takes place randomly, the result is that blends of the tetrahydrofuran/but-2-yne-1,4-diol copolymer with polytetrahydrofuran which contains no C—C triple bonds occur, in particular in the case of a low C—C triple bond content of the copolymer, for example when the triple bond content of the copolymer is less than 1. Since separation of the tetrahydrofuran/but-2-yne-1,4-diol copolymer from the polytetrahydrofuran present therein is not possible, the triple bond content of the copolymer can be determined only statistically, for example with the aid of nuclear magnetic resonance spectroscopy, which explains the fractional numbers stated for its triple bond content. Owing to their poor separability, these blends of copolymer and PTHF are further used as such. The average molecular weight $M_n$ of the polytetrahydrofuran present in these blends has roughly the same value as that of the particular copolymer prepared and is from 500 to 3500 Dalton.

The novel copolymers are produced by the heteropolyacid-catalyzed copolymerization of tetrahydrofuran with but-2-yne-1,4-diol, also referred to below as butynediol for the sake of simplicity.

Examples of heteropolyacids which can be used as catalysts in the novel process are the following compounds:
dodecamolybdatophosphoric acid ($H_3PMo_{12}O_{40}$.n $H_2O$),
dodecamolybdatosilicic acid ($H_4SiMO_{12}O_{40}$.n $H_2O$),
dodecamolybdatoceric(IV) acid ($H_8CeMo_{12}O_{42}$.n $H_2O$),
dodecamolybdatoarsenic(V) acid ($H_3AsMo_{12}O_{42}$.n $H_2O$),
hexamolybdatochromic(III) acid ($H_3CrMo_6O_{24}H_6$.n $H_2O$),
hexamolybdatonickelic(II) acid ($H_4NiMO_6O_{24}H_6H_2O$),
hexamolybdatoiodic acid ($H_5MO_6O_{24}$ .n $H_2O$),
octadecamolybdatodiphosphoric acid ($H_6P_2Mo_{18}O_{62}$.11 $H_2O$),
octadecamolybdatodiarsenic(V) acid ($H_6AS_2Mo_{18}0_{62}$.25 $H_2O$),
nonamolybdatomanganic(IV) acid ($H_6M_nMo_9O_{32}$.n $H_2O$),
undecamolybdatovanadatophosphoric acid ($H_4PMo_{11}VO_{40}$.n $H_2O$),
decamolybdatodivanadatophosphoric acid ($H_5PMo_1OV_2O_{40}$.n $H_2O$),
dodecavanadatophosphoric acid ($H_7PV_{12}O_{36}$.n $H_2O$),
dodecatungstatosilicic acid ($H_4SiW_{12}O_{40}$.7 $H_2O$),
dodecatungstatoboric acid ($H_5BW_{12}O_{40}$.n $H_2O$),
octadecatungstatodiphosphoric acid ($H_6P_2W_{19}O_{62}$ .14 $H_2O$),
octadecatungstatodiarsenic(V) acid ($H_6AS_2W_8O_{62}$.14 $H_2O$), and
hexamolybdatohexatungstatophosphoric acid ($H_3PMO_6W_6O_{40}$.n $H_2O$).

Mixtures of heteropolyacids can of course also be used. Owing to their easy accessibility, dodecatungstatophosphoric acid, dodecamolybdatophosphoric acid, nonamolybdatophosphoric acid, dodecamolybdatosilicic acid and dodecatungstatosilicic acid are preferably used in the novel process.

The free heteropolyacids are preferably used according to the invention as catalysts, but it is also possible to use their salts, in particular their alkali metal and alkaline earth metal salts, as catalysts. The heteropolyacids and their salts are known compounds and can be prepared by known processes, for example by the methods of Brauer (editor): Handbuch der Praparativen Anorganischen Chemie, Vol. III, Enke, Stuttgart, 1981, or by the process of Top. Curr. Chem. 76 (1978), 1.

The heteropolyacids thus prepared are in general in hydrated form. Before they are used in the novel process, they are preferably freed from the water present therein and bonded by coordinate bonds. This dehydration can advantageously be carried out thermally, for example by the method of Makromol. Chem. 190 (1989), 929.

As stated above, the heteropolyacid catalysts are preferably used in their dehydrated form in the novel process. A water content of the heteropolyacid catalyst of from 0.1 to 15 mol of water/mol of heteropolyacid leads to disadvantageous results, but the copolymerization reaction still takes place even in the case of these water contents. However, heteropolyacid catalysts having a water content of less than 0.1 mol of water/mol of heteropolyacid are preferably used, in particular anhydrous heteropolyacids.

For the preparation of the novel THF/butynediol copolymers, mixtures of THF and butynediol are reacted over the heteropolyacid catalyst. In this reaction, tetrahydrofuran oligomers having a low molecular weight may also be present. The comonomers THF and butynediol are preferably used in essentially anhydrous form, but low water contents of these reactants of up to about 100 ppm by weight can be tolerated. The butynediol content of the reaction mixture, which, in addition to the two reactants THF and butynediol, also comprises the heteropolyacid catalyst and, if desired, a solvent which is inert under the reaction conditions, influences the average molecular weight $M_n$ of the copolymer formed. As a rule, the higher the content of but-2-yne-1,4-diol in the reaction mixture, the lower is the resulting average molecular weight of the copolymer formed. Accordingly, the average molecular weight of the copolymer produced increases with decreasing but-2-yne-1, 4-diol content of the reaction mixture. The term average molecular weight or average molecular mass is understood in this application as meaning the number average molecular weight $M_n$ of the polymers contained in the resulting polymerization product.

Furthermore, the butynediol content of the reaction mixture influences its phase behavior. At high butynediol contents of the reaction mixture, the latter consists of a homogeneous phase, with the result that working up of the reaction mixture and removal of the catalyst may subsequently be more difficult. At very low butynediol contents of the reaction mixture, the heteropolyacid is no longer completely dissolved by the two comonomers THF and butynediol. The novel process is preferably carried out using butynediol contents of the reaction mixture at which two homogeneous liquid phases form in the reaction mixture, the heavier lower phase containing the major part of the heteropoly acid catalyst and of the butynediol in addition to THF and freshly formed copolymer and the lighter, upper phase comprising essentially THF and copolymer dissolved therein, in addition to residual amounts of butynediol and catalyst.

Particularly in the batchwise embodiment of the novel process, but-2-yne-1,4-diol contents of the reaction mixture are advantageously from 0.1 to 15, preferably from 1 to 8, mol of but-2-yne-1,4-diol per mol of heteropolyacid.

However, the novel THF/butynediol copolymers are preferably prepared by the continuous procedure. Since, when the novel process is carried out by the continuous procedure, some of the but-2-yne-1,4-diol dissolved in the upper, essentially product-and monomer-containing phase is continuously discharged, together with the product, from the reactor, but but-2-yne-1,4-diol present in the lower, essentially catalyst-containing phase is consumed in the formation of the copolymer, it is advantageous to control the feed of the but-2-yne-1,4-diol to the reaction mixture for replenishing the consumed and discharged but-2-yne-1,4-diol in such a way that the above-mentioned concentration ratios are established in the catalyst phase. These conditions result in the formation of the reaction system described above and comprising two homogeneous, liquid phases, in which system THF/butynediol copolymers have virtually any desired average molecular weights, in particular those copolymes having average molecular weights of from 500 to 3500, particularly preferably from 650 to 2900, Dalton, can be prepared in a controlled manner and with good selectivity.

It has been found that, for the preparation of the novel THF/butynediol copolymers containing C—C triple bonds and having certain average molecular weights, for example average molecular weights of from 500 to 3500, and a narrow molecular weight distribution, particularly by the continuous process, it is advantageous if the but-2-yne-1,4- diol content of the catalyst phase, which content is required for the preparation of such a polymer, is kept as constant as possible. In a continuous process, it is therefore advantageous to adopt a procedure in which the but-2-yne-1,4-diol in the reaction mixture is continuously replenished at the rate at which it is consumed in the reaction, taking into account the diol discharged together with the product-containing upper phase, by feeding in fresh or recycled butynediol, in such a way that the but-2-yne-1,4-diol content of the catalyst phase is kept substantially constant.

In the procedure according to EP-A 503 392, the but-2-yne-1,4-diol content of the heteropolyacid-containing catalyst phase can be measured by measuring the electrical conductivity. The feed of fresh but-2-yne-1,4-diol can be controlled by this measuring method in accordance with the requirements of a continuous, industrial process, via a coupled analog control. The measurement of the electrical conductivity can be carried out in the novel process, for example, with the aid of the techniques, circuits and measuring arrangements as described by T. and L. Shedlovski in A. Weissberger, B. W. Rossiter (Ed.) Techniques of Chemistry, Volume I, pages 163–204, Wiley-Interscience, New York, 1971. The concentration of the relevant but-2-yne-1,4-diol in the catalyst phase can be easily determined with the aid of the measured conductivity value obtained, on the basis of a calibration curve prepared beforehand. Since the conductivity measurement is an electrical measuring method, the measuring apparatus can be very easily coupled to the but-2-yne-1,4-diol metering apparatus for the purpose of analog control of the but-2-yne-1,4-diol addition. This combined measuring and metering method has a very advantageous effect on the product quality, particularly in the continuous embodiment of the novel process.

The average molecular weight $M_n$ of the novel THF/butynediol copolymers containing C—C triple bonds and formed in the novel process is not dependent only on the amount of heteropolyacid catalyst added and of but-2-yne-1,4-diol but is also influenced by the type of heteropolyacid used.

By varying the amount and type of heteropolyacid used or the but-2-yne-1,4-diol content of the catalyst phase, it is possible to prepare tailor-made novel copolymers containing C—C triple bonds with a certain average molecular weight and simultaneously with a relatively narrow molecular weight distribution. These process parameters can generally be established by means of a few routine experiments.

Both in the continuous and in the batchwise embodiment of the novel process, the heteropolyacid is advantageously used in amounts of from 10 to 300, preferably from 50 to 150, parts by weight, based on 100 parts by weight of tetrahydrofuran. It is also possible to use larger amounts of the heteropolyacid catalyst.

The heteropolyacid can be added to the reaction in solid form, after which it is gradually solvated with formation of the liquid catalyst phase, as a result of being brought into contact with the further reactants. It is also possible to proceed in such a way that the solid heteropolyacid is made into a slurry with the but-2-yne-1,4-diol to be used and/or with the tetrahydrofuran and the resulting catalyst solution is passed in the form of the liquid catalyst phase into the reactor. Both the catalyst phase and the monomeric starting material may be initially taken in the reactor. However, both components may also be simultaneously passed into the reactor.

The polymerization is usually carried out at from 0° to 100° C., preferably from 30° to 80° C. Atmospheric pressure is advantageously employed, but the reaction under superatmospheric pressure, mainly under the autogenous pressure of the reaction system, may also prove advantageous.

Since the polymerization is preferably carried out in a two-phase system, it is necessary to ensure thorough mixing of the two phases. For this purpose, the reactors must be equipped with efficient mixing means, for example stirrers, both in the batchwise and in the continuous procedure. In the batchwise process, a stirred kettle is generally used for this purpose, the two liquid phases being separated from one another after the end of the reaction.

However, the continuous procedure is preferably used. Here, the reaction can be carried out in conventional reactors or reactor arrangements suitable for continuous processes, for example in tube reactors which are equipped with internal baffles which ensure thorough mixing of the two-phase system or in stirred kettle cascades, the reaction being followed by continuous removal of the catalyst phase from the monomer- and product-containing upper phase. An apparatus as shown schematically in the figure is advantageously used in the novel process.

BRIEF DESCRIPTION OF THE DRAWINGS

This apparatus is a stirred kettle 1 which is combined with a phase separator 2, is otherwise of conventional design and may be equipped with either internal or external heating and is provided with generally separate inlet connections 5 for passing in the individual reactants and gasing with inert gas. In the figure, for the sake of clarity the kettle heating is not shown and only one inlet connection 5, representative for all others, is shown. Furthermore, an apparatus for pressure equilibration 6 and a discharge connection 7 are installed on the reactor. All these apparatuses are provided with separate control apparatuses 8, 9, 10, for example slide valves or valves, which permit opening and closing of these connections and regulation of the feed. The reactor is provided with a stirrer 12 which is connected to the outside by the passage 11 sealed with the bush 13. The stirred kettle 1 is connected to the phase separator 2 by the feeds 3 and 4 mounted roughly at the height of the upper and of the lower third, respectively. The product solution obtained in the reaction is removed from the apparatus via the outlet connection 18, which is advantageously mounted above the feed 3. The outflow of the product solution is controlled by means of the control apparatus 19, which may be, for example, a slide valve or a valve.

For operation of this continuous apparatus, the reactants are initially taken in the reactor and are thoroughly mixed with the stirrer 12 at the desired reaction temperature, an emulsion-like mixture of catalyst phase and upper phase being formed. The flow generated in the reaction mixture by the stirrer results in the emulsion-like mixture passing via the feed 3 into the phase separator 2, in which the catalyst phase and the monomer- and product-containing upper phase separate owing to their different densities. The clear, colorless, product-containing upper phase and the clear catalyst phase, which has different colors depending on the heteropolyacid used, separate out from the cloudy, emulsion-like reaction mixture, roughly above the line 16 and below the line 17, respectively. The product phase is taken off by the outlet 18 while, owing to the suction generated by stirrer 12, the catalyst phase flows back via the feed 4 into the stirred kettle and is thoroughly mixed there again with the monomer- and product-containing upper phase. The lines 14 and 15 denote the approximate liquid meniscus and liquid level in the stirred kettle and phase separator, respectively, during operation. Fresh THF and fresh but-2-yne-1,4-diol are introduced into the stirred kettle via the filling connection 5. The diol feed is controlled with the aid of the conductivity cell 20 immersed in the liquid catalyst phase, in such a way that the desired diol content in the catalyst phase is kept constant within the accuracy of control.

Fresh THF is usually metered into the reactor with control by a level control. Fresh THF is advantageously added at a rate at which product and unconverted THF are discharged from the reaction apparatus. In this way, the residence time, and therefore the polymerization time, can be controlled, providing a further means for influencing and establishing the average molecular weight $M_n$ of the copolymer formed. In general, depending on the amount of catalyst and the reaction temperature, the polymerization is carried out in the batchwise process over a period of from 0.5 to 50, preferably from 1 to 10, particularly preferably from 1 to 8, hours. In a continuous process, residence times of from 1 to 10, preferably from 2 to 8, hours are usually established. At the beginning of the continuous reaction, the reaction system described requires a certain time for a steady-state equilibrium to be established and during which it may be advantageous to keep the outlet 18 closed with the aid of the control apparatus 19, i.e. to discharge no product solution from the reaction apparatus.

The catalyst phase remains in the reaction apparatus and, according to the catalyst losses resulting from the discharge of small amounts of catalyst with the product-containing upper phase, is continuously replenished by adding fresh catalyst and/or, if required, by recycling the discharged catalyst.

The process for the novel preparation of the novel THF/butynediol copolymers containing C—C triple bonds is advantageously carried out under an inert gas atmosphere, and any desired inert gases, such as nitrogen or argon, may be used. Before being used, the reactants are freed from any water and peroxides present therein.

The addition of organic solvents which are inert under the reaction conditions, for example aliphatic and aromatic hydrocarbons or halohydrocarbons, is possible and may have advantageous effects in that the phase separation of catalyst phase and upper phase is facilitated. As a rule, the THF serves both as a reactant and as a solvent in the novel process.

The copolymer-containing upper phase can be worked up, for example, by neutralizing traces of heteropolyacid present therein by adding a base, for example an alkali metal or alkaline earth metal hydroxide solution, ammonia, an alkali metal or alkaline earth metal carbonate solution or an alkali metal or alkaline earth metal bicarbonate solution, distilling off the monomers present therein and filtering the novel THF/butynediol copolymers containing C—C triple bonds and remaining in the distillation residue in order to separate off precipitated salts. The monomers and low molecular weight THF/butynediol cooligomers recovered in the distillation can of course be recycled to the reaction.

The copolymer-containing upper phase is, however, preferably freed of residual amounts of heteropolyacid by adding hydrocarbons, for example n-heptane or n-octane, and then treating with active carbon, by the procedure described in U.S. Pat. No. 4,677,231.

It was surprising that the polymerization of THF with but-2-yne-1,4-diol in the presence of heteropolyacids takes place without complications in spite of the C—C triple bond present in the butynediol. For example, it was found that, when cis-but-2-ene-1,4-diol was used instead of but-2-yne-1,4-diol in continuous polymerization experiments, the catalyst phase became black and the THF/but-2-ene-1,4-diol copolymers containing C—C double bonds and obtained at low THF conversions had an intense dark color.

It was furthermore surprising that, in the copolymerization of tetrahydrofuran with but-2-yne-1,4-diol, in particular in the preparation of copolymers having a relatively low average molecular weight $M_n$, which are of particular commercial interest, considerably higher space-time yields can be achieved than is the case where the saturated 1,4-butanediol is used instead of butynediol.

The novel THF/butynediol copolymers serve as diol components for the preparation of thermoplastic polyurethanes and polyesters.

Furthermore, the novel THF/butynediol copolymers can be converted into polytetrahydrofuran by complete hydrogenation of the C—C triple bonds, polytetrahydrofuran of especially high purity, in particular having a particularly low color number and dispersity D, being formed. The C—C triple bonds of the novel THF/butynediol copolymers can also be converted into C—C double bonds by partial hydrogenation, resulting in a polymer which corresponds to a THF/But-2-ene-1,4-diol copolymer in terms of its chemical structure. Such THF/but-2-ene-1,4-diol copolymers serve, for example, as diol components for the preparation of radiation-curable polyurethane and polyester finishes. Such THF/but-2-ene-1,4-diol copolymers cannot be obtained in satisfactory quality by copolymerizing tetrahydrofuran with but-2-ene-1,4-diol by methods similar to the novel process.

For the preparation of polytetrahydrofuran from the novel THF/butynediol copolymers, the latter are subjected to catalytic hyrogenation, which is carried out by the procedure in which all C—C triple bonds present in the copolymer are converted into C—C single bonds. For this purpose, the novel THF/butynediol copolymers are converted into polyoxytetramethylene glycol in the presence of hydrogen and of a hydrogenation catalyst at in general from 1 to 300, preferably from 20 to 250, in particular from 40 to 200°, bar and at in general from 20 to 250° C., preferably from 60 to 200° C., and particularly preferably from 100 to 160° C. The polyoxytetramethylene glycols obtained have an average molecular weight $M_n$ of in general from 500 to 3500, preferably from 650 to 2900, Dalton, depending on the average molecular weight $M_n$ of the THF/butynediol copolymer used in the hydrogenation.

The novel process for the hydrogenation of THF/butynediol copolymers to polytetrahydrofuran can be carried out in the absence of a solvent or advantageously in the presence of a solvent which is inert under the reaction conditions. Examples of such solvents are ethers, such as dioxane, dimethoxyethane, tetrahydrofuran, methyl tert-butyl ether and di-n-butyl ether, alcohols, such as methanol, ethanol, propanol, isopropanol, butanol, isobutanol and tert-butanol, hydrocarbons, such as n-hexane, n-heptane and n-octane, and N-alkyllactams, such as N-methylpyrrolidone and N-octylpyrrolidone. Preferred solvents are tetrahydrofuran and/or hydrocarbons. The THF- and hydrocarbon-containing reactive mixtures obtained after residual amounts of heteropolyacid catalyst have been separated off are particularly preferably used in the hydrogenation.

In general, all catalysts which are suitable for the hydrogenation of C—C triple bonds may be used as hydrogenation catalysts in the novel process. Hydrogenation catalysts which dissolve in the reaction medium to give a homogeneous solution, as described, for example, in Houben-weyl, Methoden der organischen Chemie, Volume IV/1c, pages 16 to 26, may also be used.

However, the novel process is preferably carried out using heterogeneous hydrogenation catalysts, i.e. hydrogenation catalysts which are essentially insoluble in the reaction medium. In principle, virtually all heterogeneous hydrogenation catalysts can be used for the hydrogenation of C—C triple bonds of the copolymers to C—C single bonds. Among these hydrogenation catalysts, preferred ones are those which contain one or more elements of the groups Ib, VIIb and/or VIIIb of the Periodic Table of Elements, in particular nickel, copper and/or palladium. In addition to these components and, if required, a carrier, these catalysts may contain one or more other elements, such as chromium, tungsten, molybdenum, manganese and/or rhenium. As a result of the preparation, oxidized phosphorus compounds, for example phosphates, may also be present in the catalysts.

Heterogeneous hydrogenation catalysts which consist of metals in activated, finely divided form with a large surface area, for example Raney nickel, Raney copper or palladium sponge, can be used in the novel process.

For example, precipitated catalysts may also be used in the novel process. Such catalysts can be prepared by precipitating their catalytically active components from the salt solutions thereof, in particular from the solutions of the nitrates and/or acetates thereof, for example by adding alkali metal and/or alkaline earth metal hydroxide and/or carbonate solutions, as, for example, sparingly soluble hydroxides, hydrated oxides, basic salts or carbonates, drying the precipitates obtained and then converting them, by calcination at in general from 300 to 700° C., in particular from 400 to 600° C., into the relevant oxides, mixed oxides and/or mixed-valency oxides, which are reduced to the relevant metals and/or oxide compounds of low oxidation state by treatment with hydrogen or with hydrogen-containing gases at, as a rule, from 100 to 700° C., in particular from 150 to 400° C., and are converted into the actual, catalytically active form. As a rule, reduction is continued until no more water is formed.

In the preparation of precipitated catalysts which contain a carrier, the precipitation of the catalytically active components may be affected in the presence of the relevant carrier. However, the catalytically active components advantageously may also be precipitated simultaneously with the carrier from the relevant salt solutions.

Supported catalysts prepared in a conventional manner and containing one or more of the abovementioned catalytically active elements can also be used as heterogeneous hydrogenation catalysts in the novel process. Such supported catalysts are advantageously prepared by impregnation of the carrier with a metal salt solution of the relevant elements, subsequent drying and calcination at in general from 300 to 700° C., preferably from 400 to 600° C., and reduction in a hydrogen-containing gas stream. Drying of the impregnated carrier is generally carried out at from 20 to 200° C., preferably from 50 to 150° C., at atmospheric or reduced pressure. Higher drying temperatures are also possible. The catalytically active catalyst components are generally reduced under the conditions stated above for the precipitated catalysts.

In general, the oxides of the alkaline earth metals, of aluminum and of titanium, zirconium dioxide, silica, kieselguhr, silica gel, aluminas, silicates, such as magnesium or aluminum silicates, barium sulfate or active carbon may be used as carriers. Preferred carriers are zirconium dioxide, aluminas, silica and active carbon. Mixtures of different carriers can of course also be used as carriers for catalysts which may be used in the novel process.

Hydrogenation catalysts which are preferably used in the novel process are Raney nickel, Raney copper, palladium sponge, impregnated supported catalysts, such as palladium on active carbon, palladium on alumina, palladium on silica, palladium on calcium oxide, palladium on barium sulfate, nickel on alumina, nickel on silica, nickel on zirconium dioxide, nickel on titanium dioxide, nickel on active carbon, copper on alumina, copper on silica, copper on zirconium dioxide, copper on titanium dioxide, copper on active carbon or nickel and copper on silica, and carrier-containing precipitated catalysts, such as Ni/Cu on zirconium dioxide, Ni/Cu on alumina, or Ni/Cu on titanium dioxide.

Raney nickel, the abovementioned palladium supported catalysts, in particular palladium on alumina or palladium on a carrier comprising alumina and calcium oxide and nickel and copper on carrier-containing precipitated catalysts, in particular nickel and copper on zirconium dioxide catalysts, are particularly preferably used in the novel hydrogenation process for the preparation of polytetrahydrofuran.

The palladium supported catalysts contain in general from 0.2 to 10, preferably from 0.5 to 5, % by weight, calculated as Pd and based on the total weight of the catalyst, of palladium. The alumina/calcium oxide carrier for the palladium supported catalysts may contain in general up to 50, preferably up to 30, % by weight, based on the weight of the carrier, of calcium oxide.

Further preferred supported catalysts are nickel and copper on silica catalysts containing in general from 5 to 40, preferably from 10 to 30, % by weight, calculated as NiO, of nickel, in general from 1 to 15, preferably from 5 to 10, % by weight, calculated as CuO, of copper and in general from 10 to 90, preferably from 30 to 80, % by weight, based in each case on the total weight of the unreduced oxide catalyst, of $SiO_2$. These catalysts may additionally contain from 0.1 to 5% by weight, calculated as $Mn_3O_4$, of manganese and from 0.1 to 5% by weight, calculated as $H_3PO_4$, of phosphorus, based in each case on the total weight of the unreduced oxide catalyst. Of course, the abovementioned contents of the catalyst components add up to a total content of 100% by weight of these components in the catalyst. Advantageously, these catalysts are prepared by impregnation of silica moldings with salt solutions of the catalytically active components, for example solutions of the nitrates, acetates or sulfates thereof, subsequent drying of the impregnated carriers at from 20 to 200° C., preferably from 100 to 150° C., under atmospheric or reduced pressure, calcination at from 400 to 600° C., preferably from 500 to 600° C., and reduction with hydrogen-containing gases. Such catalysts are disclosed in, for example, EP-A 295 435.

The nickel and copper on zirconium dioxide precipitated catalysts may contain in general from 20 to 70, preferably from 40 to 60, % by weight, calculated as NiO, of nickel, in general from 5 to 40, preferably from 10 to 35, % by weight, calculated as CuO, of copper and in general from 25 to 45% by weight, based in each case on the total weight of the unreduced oxide catalyst, of zirconium dioxide. Additionally these catalysts may contain from 0.1 to 5% by weight of molybdenum, calculated as $MoO_3$ and based on the total weight of the unreduced oxide catalyst. Such catalysts and their preparation are disclosed in U.S. Pat. No. 5,037,793, which is hereby incorporated by reference.

The novel process can be carried out both continuously and batchwise. In the continuous procedure, it is possible to use, for example, tube reactors in which the catalyst is advantageously arranged in the form of a fixed bed, over which the reaction mixture can be passed by the liquid-phase up to a trickle-bed method. In the batchwise procedure, either simple stirred reactors or, advantageously, loop reactors may be used. The catalyst is advantageously arranged in the form of a fixed bed when loop reactors are used, and the heterogeneous catalyst is preferably used as a suspension when stirred reactors are used. The novel process is preferably carried out in the liquid phase.

The hydrogenation product polytetrahydrofuran (PTHF) is generally isolated from the discharged hydrogenation mixture in a conventional manner, for example by distillative removal of the solvent present in the discharged hydrogenation mixture and any other low molecular weight compounds present.

Polytetrahydrofuran is prepared worldwide and serves as an intermediate for the preparation of polyurethane, polyester and polyamide elastomers, for the preparation of which it is used as the diol component. The incorporation of PTHF in these polymers results in them being soft and flexible, and PTHF is therefore also referred to as the soft segment of these polymers.

In the novel hydrogenation process, tetrahydrofuran/but-2-yne-1,4-diol copolymers are converted into polytetrahydrofuran having a narrow molecular weight distribution and a very low color number.

The present invention furthermore relates to a process for the preparation of tetrahydrofuran/but-2-ene-1,4-diol copolymers by the partial hydrogenation of the triple bonds of the novel THF/butynediol copolymers to double bonds.

The novel polyoxytetramethylene glycols which contain but-2-ene-1,4-diyl groups and likewise form the subject of the present invention have an average molecular weight of in general from 500 to 3500, preferably from 650 to 2700, Dalton and a C—C double bond content which corresponds to the but-2-ene-1,4-diyl content of the polyoxytetramethylene glycol and is in general from 0.1 to 3, preferably from 0.2 to 2, particularly preferably from 0.3 to 1.5, mol of double bonds —CH=CH—/mol of polyoxytetramethylene glycol, as established by determining the iodine number by the method according to Kaufmann (Deutsches Arzneibuch; 10th edition 1991 with 2nd Supplement 1993; official edition; V. 3.4.4 Jodzahl; Deutscher Apotheker Verlag, Stuttgart). In conformity with their preparation from the novel tetrahydrofuran/but-2-yne-1,4-diol copolymers, the but-2-ene-1,4-diyl-containing polyoxytetramethylene glycols, referred to below as THF/but-2-ene-1,4-diol copolymers, contain the but-2-ene-1,4-diyl units distributed over the polymer, similarly to the starting material tetrahydrofuran/but-2-yne-1,4-diol copolymer. Accordingly, the but-2-ene-1,4-diyl units are present for the most part as terminal groups, bonded to a terminal OH group, in the THF/but-2-ene-1,4-diol copolymer.

As a result of their preparation, the novel tetrahydrofuran/but-2-ene-1,4-diol copolymers generally are present as a mixture with polytetrahydrofuran, partly due to the use of tetrahydrofuran/but-2-ene-1,4-diol copolymer/polytetrahydrofuran mixtures for their preparation and partly owing to complete hydrogenation of the C—C triple bonds to C—C single bonds.

The catalysts stated above for the hydrogenation of C—C triple bonds to C—C single bonds may be used for hydrogenating the C—C triple bonds to C—C double bonds, but in general it should be ensured that the amount of hydrogen used for the partial hydrogenation does not exceed the stoichiometric amount of hydrogen which is required for the partial hydrogenation of the C—C triple bonds to C—C double bonds.

Partially poisoned hydrogenation catalysts, for example Lindlar palladium, which can be prepared by impregnation of a carrier, for example calcium carbonate, with a water-soluble palladium compound, eg. $Pd(NO_3)_2$, reduction of the applied palladium compound with, for example, hydrogen to palladium metal and subsequent partial poisoning of the resulting palladium supported catalyst with a lead compound, eg. lead (II) acetate, are preferably used for the partial hydrogenation of the C—C triple bonds to C—C double bonds. Such Lindlar catalysts are commercially available.

Other preferred, partially poisoned palladium catalysts are the catalysts described in German Patent Application No. P 43 33 293.5, which can be prepared by gradual gas-phase deposition of first palladium and then lead and/or cadmium onto a metal wire fabric or metal foil.

The partial hydrogenation of the C—C triple bonds of the tetrahydrofuran/but-2-yne-1,4-diol copolymers to C—C double bonds is carried out in general at from 0 to 100° C., preferably from 0 to 50° C., particularly preferably from 10 to 30° C., and at from 1 to 50, preferably 1 to 5, in particular 2 to 3, bar. The hydrogen is preferably used in the stoichiometric amount required for the partial hydrogenation of C—C triple bonds. If it is not intended to hydrogenate all C—C triple bonds to double bonds, the hydrogen may also be introduced in an amount smaller than the stoichiometric amount. The hydrogenation may be carried out either batchwise, for example in stirred kettles with suspended catalysts, or continuously, for example in tube reactors with a fixed-bed arrangement of the catalyst.

The starting materials tetrahydrofuran and butynediol used for the preparation of the novel copolymers are major products of the chemical industry and can be prepared, for example, by the processes stated in Ullmanns Encyklopädie der technischen Chemie, 4th edition, Volume 12, pages 20–22, Verlag Chemie, Weinheim 1976, or Ullmann's Encyclopedia of Industrial Chemistry, 5th Ed., Vol. A4, pages 455–457 and 462, VCH Verlagsgesellschaft, Weinheim 1985.

EXAMPLES

The average molecular weights ($M_n$) of the polymers prepared according to the examples were determined by determining the OH number. The OH number was determined by esterification of the hydroxyl groups with an excess of an acetic anhydride/pyridine mixture. After the reaction, excess acetic anhydride was hydrolyzed to acetic acid with water and the acetic acid thus liberated was back-titrated with sodium hydroxide solution. A blank sample which contained no polymer was treated in the same manner.

The OH number of the sample is the amount of potassium hydroxide in mg which is equivalent to acetic acid bound in the esterification of 1 g of substance. $M_n$ was calculated from the OH number thus determined, using the following formula:

$$M_n = 56.100.2/OH \text{ number [g/mol]}.$$

The molecular weight distribution, referred to below as the dispersity D, was calculated from the ratio of the weight average molecular weight ($M_w$) to the number average molecular weight ($M_n$), using the equation $$M_w/M_n = D$$

$M_w$ and $M_n$ were determined by gel permeation chromatography, a standardized polystyrene being used for calibration. From the chromatographs obtained, the number average molecular weight $M_n$ was calculated according to the equation $$M_n \Sigma c_i / \Sigma(c_i/M_i)$$

and the weight average molecular weight $M_w$ according to the equation $$M_w = \Sigma c_i \cdot M_i / \Sigma c_i$$

where $c_i$ is the concentration of the individual polymer species i in the polymer mixture obtained and $M_i$ is the molecular weight of the individual polymer species i.

All reactants used for the preparation of the unsaturated polyoxytetramethylene glycols were peroxide-free.

The $^1$HRMR spectra of the products obtained were recorded in the solvent $CDCl_3$ (internal standard tetramethylsilane).

Example 1

1100 g of THF which contained 4% by weight of but-2-yne-1,4-diol were thoroughly stirred with 550 g of anhydrous dodecatungstatophosphoric acid in a starting period of 6 hours at 60° C. under an argon atmosphere in an apparatus as shown in the figure. Thereafter, 275 g/h of THF which contained 4% by weight of but-2-yne-1,4-diol were fed to the reactor at 60° C. while stirring, and the same amount of upper phase was discharged from the reactor. The reacted mixture was mixed with the same volume of n-heptane, a liquid catalyst-containing phase separating out. After the two phases had separated, the organic phase was passed over active carbon and the readily volatile components, such as THF and n-heptane, were then distilled off at reduced pressure. The THF conversion during an operating time of 96 hours was 30%. The polymer obtained was then subjected to molecular distillation at 150° C. and 0.4 mbar. The distillation residue (85% of the crude polymer used) had an average molecular weight of 1200 and a dispersity of 1.6.

The triple bond content based on evaluation of the $^1$H-NMR spectrum and the assignment of the individual NMR signals to certain groups of the copolymer molecule are shown in Table 1.

Example 2

1100 g of THF containing 2% by weight of butynediol were thoroughly stirred in the presence of 550 g of anhydrous dodecatungstatophosphoric acid in a starting period of 6 hours at 60° C., as described in Example 1. Thereafter, 275 g/h of THF which contained 2% by weight of but-2-yne-1,4-diol were fed in at 60° C. while stirring, and the same amount of upper phase was discharged from the reactor. The reactive mixture was worked up as described in Example 1. The THF conversion during an operating time of 100 hours was 30%. Subsequent molecular distillation as described in Example 1 gave a colorless viscous polymer as distillation residue (89% of the crude copolymer used) having an average molecular weight of 2390. The dispersity was 1.8.

For evaluation of the $^1$H-NMR spectrum, see Table 1.

Example 3

1100 g of THF containing 8% by weight of but-2-yne-1,4-diol were thoroughly stirred in the presence of 550 g of anhydrous dodecatungstatophosphoric acid in a starting period of 6 hours at 60° C., as described in Example 1. Thereafter, 275 g/h of THF which contained 8% by weight of but-2-yne-1,4-diol were fed in at 60° C. while stirring, and the same amount of upper phase was discharged from the reactor. The reactive mixture was worked up as described in Example 1. The THF conversion during an operating time of 100 hours was on average 21%. Subsequent molecular distillation as described in Example 1 gave a colorless polymer as distillation residue (84% of the crude copolymer used) having an average molecular weight of 1060. The dispersity was 1.5.

For evaluation of the $^1$H-NMR spectrum, see Table 1.

Evaluation of the $^1$H-NMR Spectra

As stated above, the novel THF/butynediol copolymers contain but-2-yn-1,4-yloxy and terminal 1-hydroxybut-2-yn-4-yloxy groups derived from the butynediol monomer and present in the interior of the copolymer and tetramethylen-1,4-yloxy and terminal 1-hydroxytetramethylen-4-yloxy groups derived from tetrahydrofuran monomer and present in the interior of the copolymer. The formula I shown below and serving merely as a model for the novel THF/butynediol copolymers shows all methylene groups which can be distinguished with respect to their chemical shift in the $^1$H-NMR spectrum. The formula I was therefore drawn in this manner only to show all possible methylene groups of the THF/butynediol copolymers which can be distinguished by their chemical shifts in the $^1$H-NMR spectrum. The relevant chemical shifts of the signals of these methylene groups in the $^1$H-NMR spectrum are likewise shown. Since the incorporation of the butynediol monomer in the THF copolymer is essentially random, it is of course not possible to give an exact chemical formula for the individual copolymers obtainable according to the invention. The structural characterization of these copolymers, i.e. the determination of the proportion of structural units present in the interior of the molecule or functioning as terminal groups and derived from the but-2-yne-1,4-diol monomer, is based on the evaluation of $^1$H-NMR spectra as shown in Table 1 and is related to the assignment of the individual NMR signals to certain methylene groups in the copolymer and the theoretical relationship of the intensities of these signals, which intensities are obtained by integrating the relevant $^1$H-NMR signals. Since no individual copolymer molecule can be characterized in the $^1$H-NMR spectrum, the evaluation of said spectrum gives only the relative frequency of the triply unsaturated structural units derived from the but-2-yne-1,4-diol monomer which are present in the interior of the copolymer and those which function as terminal groups, in the copolymer prepared according to the individual examples.

The chemical shifts of the $^1$H-NMR signals a to f, which are shown for the individual methylene groups which are only distinguished on the basis of their chemical shifts, were determined for the signal maximum in each case.

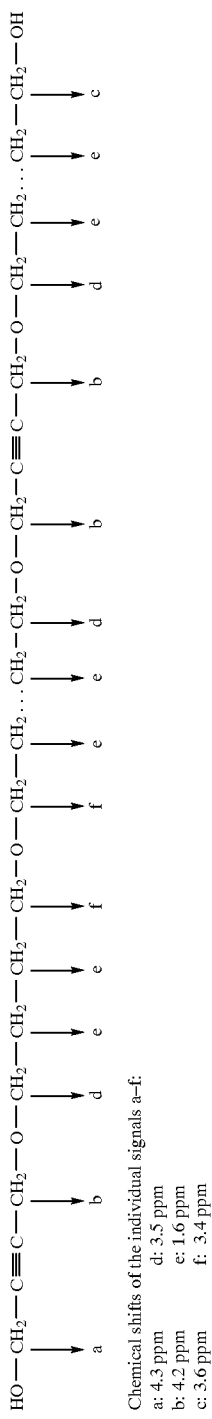
HO—CH₂—C≡C—CH₂—O—CH₂—CH₂—O—CH₂—CH₂...CH₂—CH₂—O—CH₂—CH₂—O—CH₂—C≡C—CH₂—O—CH₂—CH₂—O—CH₂—CH₂...CH₂—CH₂—O—CH₂—CH₂—OH
a  b  d  e  f  e  d  b  b  d  e  e  c
Chemical shifts of the individual signals a–f:
a: 4.3 ppm    d: 3.5 ppm
b: 4.2 ppm    e: 1.6 ppm
c: 3.6 ppm    f: 3.4 ppm

TABLE 1

Evaluation of the $^1$H-NMR spectra of the copolymers obtained according to Examples 1 to 3 (the area of the signals b and c was based on the area of the signal a, which was standardized to the area 1).

| Example | $M_n$ | a | b | c | F (TB/copolymer) |
|---|---|---|---|---|---|
| 1 | 1200 | 1 | 1.9 | 1.5 | 1.16 |
| 2 | 2390 | 1 | 4.2 | 3.5 | 1.16 |
| 3 | 1060 | 1 | 1.2 | 1.7 | 0.82 |

$M_n$ = average molecuiar weight;
F = relative triple bond content of the copolymer = (a + b) (a + c)
TB = triple bonds

Comparative Example 1 (to Example 1)

This Example shows that the copolymerization of THF with 1,4-butanediol leads to space-time yields which are very much poorer than those in the novel copolymerization of THF with but-2-yne-1,4-diol.

1100 g of THF were thoroughly stirred with 3.5% by weight of 1,4-butanediol in the presence of 550 g of anhydrous dodecatungstatophosphoric acid in a starting period of 6 hours at 60° C., as described in Example 1. Thereafter, 275 g/h of THF which contained 3.5% by weight of 1,4-butanediol were fed in at 60° C. while stirring, and the same amount of upper phase was discharged from the reactor working up of the reacted mixture was carried out as described in Example 1.

The THF conversion was on average 5.3% in an operating time of 96 hours. Subsequent molecular distillation as described in Example 1 gave, as the distillation residue, a polymer having an average molecular weight of 1090. The color number of the product was from 70 to 80 APHA.

Comparative Example 2 (to Example 1)

This Example shows that very much poorer space-time yields are obtained in the copolymerization of THF and but-2-ene-1,4-diol than in the copolymerization of THF with but-1-yne-1,4-diol and that the THF/but-1-ene-1,4-diol copolymer thus prepared has a completely unsatisfactory color number.

1100 g of THF were thoroughly stirred with 4% by weight of cis-2-butene-1,4-diol in the presence of 550 g of anhydrous dodecatungstatophosphoric acid in a starting period of 6 hours at 60° C., as described in Example 1. Thereafter, 275 g/h of THF which contained 4% by weight of cis-2-butene-1,4-diol were fed in at 60° C. while stirring, and the same amount of upper phase was discharged from the reactor working up of the reacted mixture was carried out as described in Example 1. The THF conversion was on average 5.4% during an operating time of 72 hours.

Subsequent molecular distillation as described in Example 1 gave a dark brown polymer as distillation residue (88% by weight). Analytical data of the product: Average molecular weight: $M_n$=905

Polydispersity: D=1.5

Color number APHA>150

The double bond content of the THF/but-1-ene-1,4-diol copolymer thus prepared was determined by determining the iodine number (iodine number determination according to Kaufmann: Deutsches Arzneibuch; 10th edition 1991 with 2nd Supplement 1993; official edition; V. 3.4.4 Jodzahl; Deutscher Apotheker Verlag, Stuttgart).

Method for the Determination of the Iodine Number (IN) According to Kaufmann 1 g of substance is dissolved in 15 ml of chloroform in a dry 250 ml flask for the iodine number determination. 25.0 ml of iodine monobromide solution are then slowly added. The flask is closed and is kept in the dark for 30 minutes with frequent shaking. After the addition of 10 ml of a 10% (m/V) solution of potassium iodide and 100 ml of water, the solution is titrated with 0.1 N sodium thiosulfate solution with vigorous shaking until the yellow color has virtually completely disappeared. After the addition of 5 ml of starch solution, the titration is continued dropwise until the blue color disappears ($n_1$ ml of 0.1 N sodium thiosulfate solution). A blank determination is carried out under the same conditions ($n_2$ ml of 0.1 N sodium thiosulfate solution). The iodine number is calculated using the following formula, where m is the weight of the substance in grams.

$$IN=1.269.(n_2-n_1)/m.$$

m: weight of substance in grams.

25 g of iodine were consumed per 100 g of copolymer, corresponding to a content of 0.0985 mol of double bonds per 0.11 mol of copolymer, or an F value of 0.90.

Example 4

Hydrogenation of a THF/butynediol Copolymer to PTHF

In a 300 ml metal autoclave, 50 g of the THF/butynediol copolymer obtained according to Example 1 (crude product which had not been subjected to molecular distillation), in 100 g of tetrahydrofuran, were hydrogenated with hydrogen for 6 hours with 20 g of a nickel- and copper-containing supported catalyst (prepared according to U.S. Pat. No. 5,037,793; Ni content 50% by weight, calculated as NiO; copper content 17% by weight, calculated as CuO; molybdenum content 2% by weight, calculated as $MoO_3$; carrier: $ZrO_2$, 31% by weight; 6×3 mm tablets) at 100° C. and 40 bar. The catalyst had been activated in a stream of hydrogen at 200° C. for 2 hours beforehand. After the catalyst had been separated off and the solvent distilled off at reduced pressure, 44 g of residue were obtained. This residue was furthermore subjected to a distillation at 150° C./0.3 mbar. The distillation residue obtained was a colorless polytetrahydrofuran which, according to the $^1$H-NMR spectrum, no longer contained any triple bonds. According to the $^1$H-NMR spectrum, the double bond content was less than 0.5%. The PTHF thus obtained had an average molecular weight $M_n$ of 1070 and a dispersity of 1.7. Its color number was 30 APHA.

Example 5

20 g of Raney nickel were added to 40 g of the copolymer used in Example 4, dissolved in 160 g of THF, and hydrogenation was effected with hydrogen while stirring at 120° C. and 40 bar. working up and molecular distillation of the discharged hydrogenation mixture were carried out as described in Example 4. 34 g of colorless polytetrahydrofuran which, according to the $^1$H-NMR spectrum, contained no more triple bonds and whose residual double bond content was 2.5% were obtained. The color number was 40 APHA.

Example 6

40 g of the copolymer used in Example 4, dissolved in 160 g of THF, were hydrogenated with hydrogen for 8 hours over a calcium-containing palladium on alumina supported catalyst (prepared by impregnation of an $Al_2O_3$/CaO carrier, obtained by kneading moist $Al_2O_3$/CaO, drying at 120° C. and calcining at 550° C., with an aqueous palladium nitrate solution; palladium content 0.6% by weight, calculated as Pd; calcium content 20% by weight, calculated as CaO;

79.4% by weight of $Al_2O_3$) in the form of 4 mm extrudates at 120° C. and 40 bar. The catalyst had been activated beforehand in a stream of hydrogen at 150° C. for 2 hours. Working up and distillation were carried out as described in Example 4. 33 g of colorless PTHF which, according to the $^1$H-NMR spectrum, contained no more triple bonds were obtained. The residual double bond content was 3.0% and the color number was 40 APHA.

Example 7

40 g of the copolymer used in Example 4, dissolved in 160 g of tetrahydrofuran, were hydrogenated with hydrogen for 6 hours over 200 g of palladium on alumina catalyst (prepared by impregnation of $Al_2O_3$ extrudates with an aqueous palladium nitrate solution, drying at 120° C. and subsequent calcination at 440° C.; palladium content 0.5% by weight, calculated as Pd; 99.5% by weight of $Al_2O_3$) in the form of 4 mm extrudates at 150° C. and 40 bar. The catalyst had been activated beforehand in a stream of hydrogen for 2 hours at 150° C. Working up and bulb-tube distillation of the discharged hydrogenation mixture were carried out as described in Example 4. 35 g of colorless PTHF which, according to the $^1$H-NMR spectrum, contained no more C—C triple bonds and had a residual double bond content of less than 1% were obtained. The color number was 50 APHA.

Example 8

Partial hydrogenation of the C—C triple bonds to C—C double bonds 10 g of Lindlar catalyst (5% of Pd on $CaCO_3$, poisoned with lead; obtained from Aldrich) in powder form were added to 60 g of the copolymer prepared according to Example 1 and dissolved in 140 g of tetrahydrofuran, and said copolymer was hydrogenated with hydrogen for 6 hours while stirring at 20° C. and 2 bar. Working up and molecular distillation of the discharged hydrogenation mixture were carried out as described in Example 4. 55 g of a colorless polymer which, according to the $^1$H-NMR spectrum, contained no more triple bonds and had a C—C double bond content of F=0.8 were obtained. Its color number was 40 APHA.

We claim:

1. A tetrahydrofuran/but-2-yne-1,4-diol copolymer containing C—C triple bonds and having an average molecular weight $M_n$ of from 500 to 3500 Dalton and a content of from 0.5 to 3.0 mol of triple bonds/mol of copolymer or a blend of this copolymer with polytetrahydrofuran having an average molecular weight $M_n$ of from 500 to 3500 Dalton.

2. A process for the preparation of a tetrahydrofuran/but-2-yne-1,4-diol copolymer containing C—C triple bonds, as claimed in claim 1, which comprises copolymerizing tetrahydrofuran with but-2-yne-1,4-diol with the aid of a heteropolyacid catalyst is in an essentially anhydrous reaction medium.

3. A process as claimed in claim 2, wherein the copolymerization is carried out at from 0 to 80° C.

4. A process as claimed in claim 2, wherein the copolymerization is carried out in a liquid two-phase system.

5. A process as claimed in claim 2, wherein the copolymerization is carried out continuously in a two-phase system and a but-2-yne-1,4-diol content of from 0.1 to 15 mol of but-2-yne-1,4-diol/mol of heteropolyacid is established in a catalyst phase.

6. A process as claimed in claim 2, wherein metering of the but-2-yne-1,4-diol into the reaction mixture of the copolymerization reaction is controlled by measuring the electrical conductivity of a catalyst phase.

7. A process as claimed in claim 2, wherein the copolymerization is carried out batchwise and a but-2-yne-1,4-diol content of from 0.1 to 15 mol/mol of heteropolyacid is established.

8. A process for the preparation of a polyoxytetramethylene glycol, which comprises hydrogenating a tetrahydrofuran/but-2-yne-1,4-diol copolymer as claimed in claim 1 with the aid of a hydrogenation catalyst.

9. A process as claimed in claim 8, wherein the hydrogenation catalyst is a heterogeneous hydrogenation catalyst.

10. A process as claimed in claim 8, wherein the hydrogenation is carried out at from 20 to 300° C. and from 1 to 300 bar.

11. A process as claimed in claim 8, wherein the hydrogenation catalyst is one which contains at least one element from group Ib, VIIb or VIIIb of the Periodic Table of elements as an active component.

12. A process as claimed in claim 8, wherein the hydrogenation catalyst is one which contains nickel or copper as an active component.

13. A process as claimed in claim 8, wherein the hydrogenation catalyst is one which contains palladium as an active component.

14. A process for the preparation of a polyoxytetramethylene glycol containing double bonds, which comprises partially hydrogenating the C—C triple bonds of the tetrahydrofuran/but-2-yne-1,4-diol copolymer as claimed in claim 1 over a hydrogenation catalyst.

15. A polyoxytetramethylene glycol containing internal C—C double bonds and having an average molecular weight $M_n$ of from 500 to 3500 Dalton and a content of from 0.1 to 3 mol of double bonds/mol of polyoxytetramethylene glycol or a mixture of said polyoxytetramethylene glycol with a polyoxytetrahydrofuran having an average molecular weight $M_n$ of from 500 to 3500 Dalton.

* * * * *